United States Patent
Hutsell et al.

(10) Patent No.: US 7,664,907 B1
(45) Date of Patent: Feb. 16, 2010

(54) PAGE STREAM SORTER WITH DYNAMIC BINNING

(75) Inventors: Brian D. Hutsell, Fort Worth, TX (US); James M. VanDyke, Austin, TX (US); John E. Edmondson, Arlington, MA (US); Benjamin C. Hertzberg, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 434 days.

(21) Appl. No.: 11/683,969

(22) Filed: Mar. 8, 2007

Related U.S. Application Data

(60) Provisional application No. 60/872,415, filed on Nov. 2, 2006.

(51) Int. Cl.
*G06F 12/00* (2006.01)
(52) U.S. Cl. .................. 711/104; 711/150; 711/154; 711/E12.001; 345/418
(58) Field of Classification Search .................. None
See application file for complete search history.

(56) References Cited

U.S. PATENT DOCUMENTS

| | | | |
|---|---|---|---|
| 4,477,736 A | | 10/1984 | Onishi |
| 5,937,204 A | * | 8/1999 | Schinnerer ............ 345/531 |
| 6,002,412 A | * | 12/1999 | Schinnerer ............ 345/558 |
| 6,092,158 A | * | 7/2000 | Harriman et al. ......... 711/151 |
| 6,330,645 B1 | * | 12/2001 | Harriman ............ 711/151 |
| 6,898,679 B2 | * | 5/2005 | Sadowsky et al. ........ 711/158 |
| 7,353,349 B2 | * | 4/2008 | Sadowsky et al. ........ 711/158 |
| 2003/0065897 A1 | * | 4/2003 | Sadowsky et al. ........ 711/165 |
| 2004/0215803 A1 | * | 10/2004 | Yamada et al. ........... 709/231 |
| 2005/0248579 A1 | * | 11/2005 | Sadowsky et al. ........ 345/535 |
| 2007/0156946 A1 | | 7/2007 | Lakshmanamurthy et al. |

OTHER PUBLICATIONS

Office Action dated Aug. 4, 2009 from U.S. Appl. No. 11/592,540, 14 pages.
Office Action dated Feb. 4, 2009 from U.S. Appl. No. 11/592,540, 14 pages.

\* cited by examiner

*Primary Examiner*—Kevin Verbrugge
(74) *Attorney, Agent, or Firm*—Townsend and Townsend and Crew LLP

(57) ABSTRACT

Techniques and systems for dynamic binning, in which a stream of requests to access a memory is sorted into a reordered stream that enables efficient access of the memory. A page stream sorter can group requests to access a memory in a manner that results in some "locality" in the stream of requests issued from the page stream sorter to memory, such that as few pages as possible in the same bank are accessed and/or a number of page switches needed is minimized.

20 Claims, 5 Drawing Sheets

US 7,664,907 B1

PAGE STREAM SORTER WITH DYNAMIC BINNING

CROSS-REFERENCES TO RELATED APPLICATIONS

This application claims the benefit of provisional U.S. Application No. 60/872,415, filed Nov. 2, 2006, entitled "PAGE STREAM SORTER WITH DYNAMIC BINNING," the disclosure of which is incorporated herein by reference in its entirety.

BACKGROUND OF THE INVENTION

The present invention relates to computer memory interface circuitry in general, and more particularly to the sorting of requests for efficient access to memories.

Memory devices are fast becoming a bottleneck and limiting improvements in computer system performance. Part of this is caused by the relative disparity between the increase in processor as compared to memory speed. That is, while processor speed has continued to increase at the well known rate of doubling every 18 to 24 months, memory access times have not kept pace. This gap means that more efficient use of memory bandwidth must be made in order to reduce the effect of this bottleneck and take full advantage of the improved processor performance.

Memories in computer systems are often made up of multiple dynamic random-access-memory (DRAM) circuits, partitioned into banks, which may be located in dual-in-line memory modules (DIMMs). To access data in a DRAM at a given row/bank/column address, the bank must first be opened (activated) to the desired row. A read or write command or request can then be issued to the bank/column address, implicitly using the row address which is associated with the open bank. A specific row/bank is a page. If a subsequent access requires a different row within the same bank (a "page fault" or "page break"), then the bank must first be closed (precharged) before it can be opened (activated) to the new row. The activate and precharge latencies for a given bank require sufficient amounts of data transfers to other banks in order to hide them. To the extent that these latencies are not hidden, penalties arise in the form of idle cycles which limit the effective bandwidth.

Therefore, it is desirable to have methods and systems for sorting memory requests, for example, to increase the effective bandwidth.

BRIEF SUMMARY OF THE INVENTION

Generally, systems and methods are provided for using dynamic binning, in which a stream of memory access requests is sorted into a reordered stream that enables efficient access of the memory.

A "stream" as used herein, for example in the phrase a "stream of requests" is intended to encompass continuous requests (e.g., no time lag between successive requests), requests overlapping in time (e.g., request received from multiple clients), requests separated in time by one or more periods of inactivity or other activity, and so on, and is not to be limited to an orderly, continuous flow or succession of requests. A "stream" of requests does not necessarily require (but may allow) an continuous succession of requests. A request can speak for one or more clock cycles worth of data transfers, termed "clock data transfers" or CDT. The size of a request refers to this number of clocks for that request.

In accordance with one aspect of the invention, a method comprises receiving a stream of requests to access a memory; dynamically creating one or more bins in which to buffer the stream of requests; and outputting requests from one or more of the bins to an arbiter coupled to the memory.

In another aspect, a system comprises a memory, an arbiter coupled to the memory, and a page stream sorter coupled to the arbiter. The page stream sorter is configured to receive a stream of requests to access the memory; dynamically create one or more bins in which to buffer the stream of requests; and output requests from one or more of the bins to the arbiter.

In another aspect, a system comprises a processor coupled to a page stream sorter, and an arbiter coupled to the page stream sorter and to a memory. The page stream sorter is configured to receive from the processor a stream of requests to access the memory, dynamically create one or more bins in which to buffer the stream of requests, and output requests from one or more of the bins to the arbiter.

DETAILED DESCRIPTION OF THE INVENTION

Exemplary Computer Processing Architecture

FIGS. 1 through 5 illustrate exemplary computer processing architectures in which systems and methods allow for reordering a stream of requests to memory (e.g. DRAM) with dynamic binning. However, the systems and methods disclosed herein for are not limited to any particular processing architecture. For example, the architecture described herein includes a computer system with a central processing unit (CPU) and a parallel or graphics processing unit (PPU or GPU) that supports parallel processing applications. However, the methods described herein are not limited to application on a GPU and instead are broadly applicable.

Furthermore, the systems and methods disclosed herein for are not limited to any particular memory architecture. For example, a rank is a collection of DRAMs which are selected with the same chip select signal, where all ranks share the same data wires. Memory systems may be built with one or more ranks. For simplicity of discussion, the following discussion assumes a single-rank configuration, although the benefits of page stream sorting extend to multi-rank memory systems.

Figure 1:
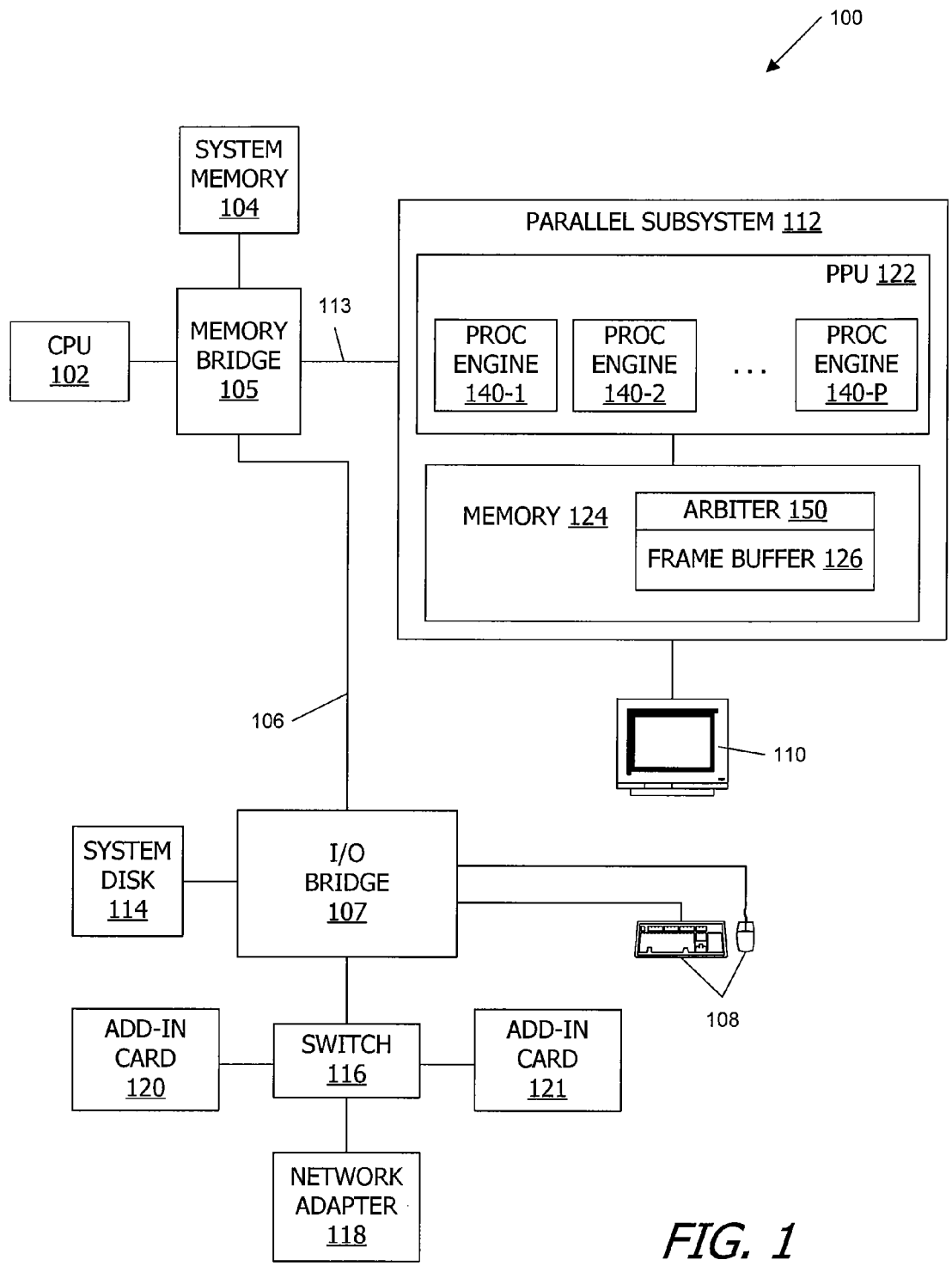
FIG. 1 is a block diagram of a computer system 100 according to one embodiment.

FIG. 1 is a block diagram of a computer system 100 according to one embodiment. Computer system 100 is merely exemplary, and a number of alterations may be made to computer system 100. Computer system 100 includes a central processing unit (CPU) or control processor 102 and a system memory 104 communicating via a communications path that may include a memory bridge 105. CPU 102 operates as the control processor of system 100, controlling and coordinating operations of other system components. Memory bridge 105 (e.g. a Northbridge chip) is connected via a communication path 106 (e.g., a point-to-point connection using the Hyper-Transport protocol) to an I/O (input/output) bridge 107. I/O bridge 107 (e.g. a Southbridge chip) receives user input from one or more user input devices 108 (e.g., keyboard, mouse) and forwards the input to CPU 102 via communication path 106 and memory bridge 105. Visual output may be provided on a pixel based display device 110 (e.g., a CRT or LCD based monitor) operating under control of a parallel or graphics subsystem 112 coupled to CPU 102 or memory bridge 105 via communication path 113, which may be implemented using, e.g., PCI Express (PCI-E), HyperTransport, or any other point-to-point or interconnect protocol. A system disk 114 is also connected to I/O bridge 107. A switch 116 provides connections between I/O bridge 107 and other components such as a network adapter 118 and various add-in cards 120, 121. Other components (not explicitly shown), including USB or other port connections, CD drives, DVD drives, and the like, may also be connected to I/O bridge 107. In various embodiments, connections among system components may be implemented using suitable protocols such as PCI (Peripheral Component Interconnect), PCI-E, AGP, HyperTransport, or any other point-to-point or interconnect protocol(s), and connections between different devices may use different protocols as is known in the art.

Parallel processing subsystem 112 includes a number N of parallel or graphics processing units (PPU or GPU) 122 and memories 124, which may be implemented, e.g., using one or more integrated circuit devices such as programmable processors, application specific integrated circuits (ASICs), and memory devices. Each GPU 122 may execute general parallel processing applications, or be configured to perform various tasks related to generating pixel data from graphics data supplied by CPU 102 and/or system memory 104 via memory bridge 105 and bus 113, interacting with memory 124 to store and update pixel data, and the like. For example, GPU 122 may generate pixel data from 2-D or 3-D scene data provided by various programs executing on CPU 102, and may read data from or write data to frame buffer 126 in memory 124.

In some embodiments, PPU 122 includes P parallel processing engines 140-1 to 140-P (collectively, processing engines 140) configured to execute multiple threads in parallel. For example, during a rendering operation, each of the multiple parallel threads might be an instance of a vertex shader program executing on attributes of a single vertex, or an instance of a pixel shader program executing on a given primitive and pixel. During general-purpose computing, each of the multiple parallel threads might be an instance of a program executing on a portion of an input data set and/or producing a portion of an output data set.

Other components (not explicitly shown), including USB or other port connections, CD drives, DVD drives, and the like, may also be connected to I/O bridge 107. In various embodiments, connections among system components may be implemented using suitable protocols such as PCI (Peripheral Component Interconnect), PCI-E, AGP, HyperTransport, or any other point-to-point or bus protocol(s), and connections between different devices may use different protocols as is known in the art.

It will be appreciated that the system shown herein is illustrative and that variations and modifications are possible. The bus topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, parallel subsystem 112 is connected to I/O bridge 107 rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

The connection of PPU 122 to the rest of system 100 may also be varied. In some embodiments, parallel system 112 is implemented as an add-in card that can be inserted into an expansion slot of system 100. In other embodiments, a GPU is integrated on a single chip with a bus bridge, such as memory bridge 105 or I/O bridge 107.

A PPU may be provided with any amount of local memory, including no local memory, and may use local memory and system memory in any combination. For instance, in a unified memory architecture (UMA) embodiment, no dedicated graphics memory device is provided, and the PPU uses system memory exclusively or almost exclusively. In UMA embodiments, the PPU may be integrated into a bus bridge chip or provided as a discrete chip with a high-speed bus (e.g., PCI-E) connecting the PPU to the bridge chip and system memory.

It is also to be understood that any number of PPUs may be included in a system, e.g., by including multiple PPUs on a single graphics card or by connecting multiple graphics cards to bus 113. Multiple PPUs may be operated in parallel to generate images for the same display device or for different display devices. In addition, PPUs embodying aspects of the present invention may be incorporated into a variety of devices, including general purpose computer systems, video game consoles and other special purpose computer systems, DVD players, handheld devices such as mobile phones or personal digital assistants, and so on.

Page Stream Sorter Overview

Figure 2:
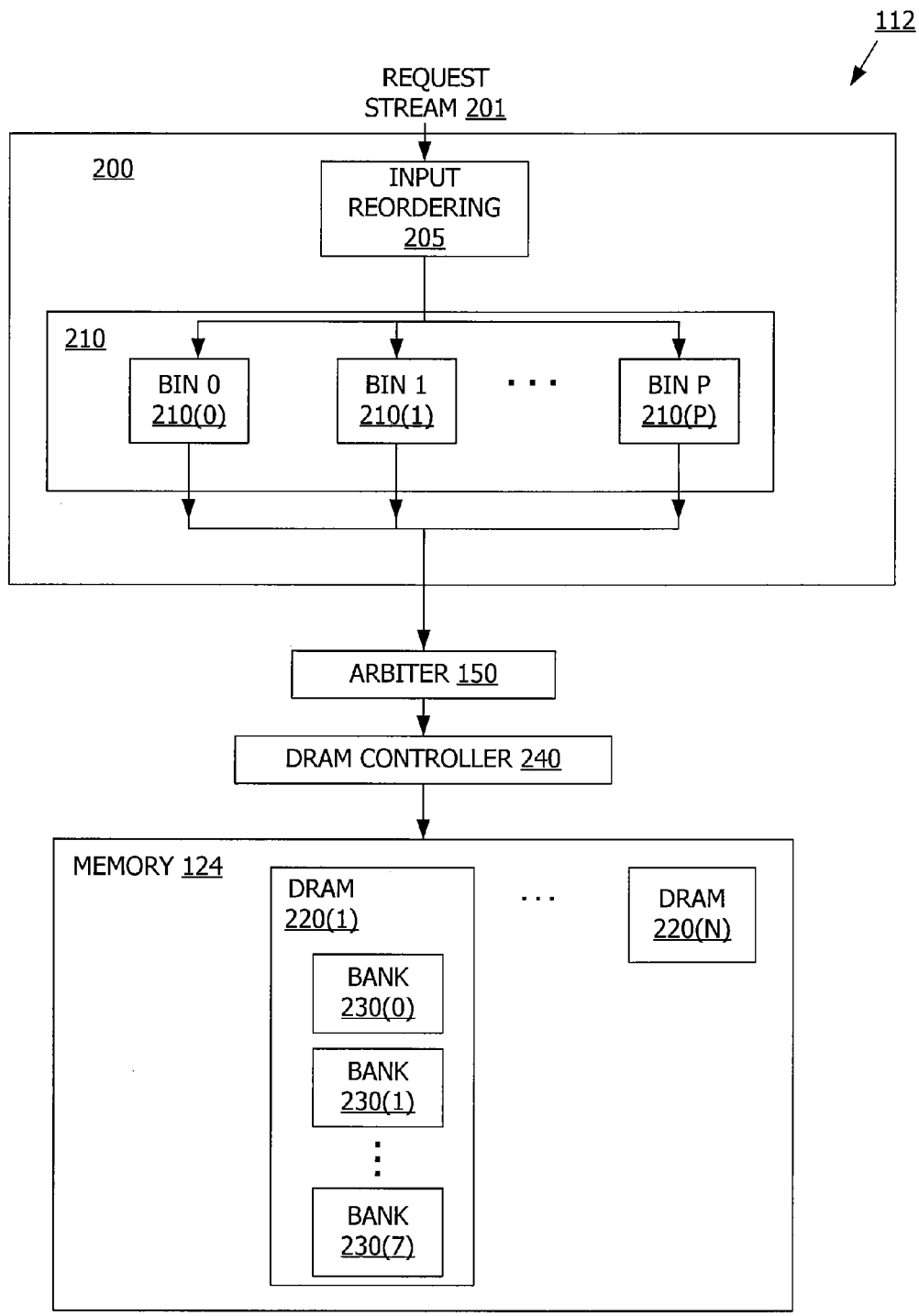
FIG. 2 illustrates a page stream sorter 200 in processing subsystem 112 of FIG. 1, in one embodiment in accordance with the present invention.

FIG. 2 illustrates a page stream sorter 200 in processing subsystem 112 of FIG. 1, in one embodiment in accordance with the present invention. Page stream sorter 200 is configured to enable efficient access to memory 124. The principle of operation of page stream sorter 200 extends to a variety of memory 124 organizations. Although memory devices are described as "DRAM," the memory type may include DRAM, SRAM, flash, any other memory type, and/or combinations of such memory types and still maintain the spirit of the invention.

In overview, page stream sorter 200 is configured to receive a stream of requests 201 to access memory 124. The stream of requests 201 may be received from one or more processing engines 140 of PPU 122, for example. Page stream sorter 200 sorts the stream of requests 201 into dynamically created "bins" 210. Bins 210 are unloaded (output) to arbiter 150 in a manner that provides efficient access to memory 124. Typically there may be from four to eight banks 230 in each DRAM 220 (although DRAM 220 is not limited to any particular number of banks 230), and any number of pages (not shown) in memory 124. Any switch between pages in a bank of memory 124 incurs a bank-management latency and can reduce effective bandwidth as explained below.

There are substantial latencies incurred for activating and precharging a bank because of the latency required for the physical operations of reading (activating) and writing (precharging) the DRAM array, while there are only minimal latencies between adjacent read or adjacent write operations.

For the same bank, there are minimum latencies between precharges and activates, activates and precharges, activates and read commands, activates and write commands, and write commands and precharges. Between different banks, there are also minimum latencies for activates within the same rank (DRAMs using the same chip select). The largest sequential combination of these latencies dictates the bank-management latency, which is the total number of clocks to change the page of a bank.

To reduce these bank management penalties, in some embodiments page stream sorter 200 is configured to attempt to have many banks 230 open at once. As request stream 201 is received, page stream sorter 200 is configured to collate the requests so that DRAM controller 240 can issue accesses to the same page of a bank 230 in DRAM 220. Page stream sorter 200 can group requests in a manner that results in some "locality" in the stream of requests issued (output from page stream sorter 200) to memory 124, such that the number of successive requests to different pages in the same bank is minimized.

To reduce this number of page faults, page stream sorter 200 can reorder the stream into a stream having fewer page faults. In a simple example, a stream of requests 201 received into page stream sorter 200 may include requests to access, in order, row0bank0, row1bank0, row0bank0, and row1bank0 of DRAM 220(1). The order of this request stream 201 can be inefficient for memory 124, since switching between row0bank0 and row1bank0 and back to row0bank0 incurs an additional exposed page fault penalty. Thus, the reordered stream of requests sent from page stream sorter 200 to memory 124 may include, in order, row0bank0, row0bank0, row1bank0, and row1bank0.

As described further below, page stream sorter 200 is configured to sort requests for temporary storage in dynamically created bins 210. Bins 210 are dynamically created for each page of DRAM 220 in memory 124 that is to be accessed by the stream of requests. Input reordering circuit 205 is configured to identify the page (row and bank) to be accessed by each request of request stream 201. The row and bank to be accessed is associated with a corresponding bin 210, and the request is temporarily stored (buffered) in the corresponding bin 210.

Thus, each of a number of P+1 bins (bins 210(0) to 210(P)) includes one or more requests that are to access a given page. For example, bin 210(0) may include a number of requests (e.g. 8) to access row0bank0. Bin 210(1) may include a number of requests (e.g., two) to access row1bank0, and so on. Data stored in each bin includes information on the request, such as whether the request comprises a read from or write to memory 124, the address in memory 124 to be accessed, data for a write to memory 124, column address, the size of the request, and so on.

A filled bin 210 may be read and emptied in an order that minimizes the number of page faults in memory 124. For example if bin 210(0) includes six requests to access row0bank0, then emptying bin 210(0) allows page stream sorter 200 to issue six successive requests to row0bank0 without page switching between the requests.

In addition to reducing page faults, the bins may be unloaded in an order that minimizes or removes the bank-management penalties. If there is sufficient DRAM traffic to different banks between the requests for a different page of the same bank, the bank-management latency may be hidden by data transfers to these banks. However, without such traffic, these latencies will be exposed as penalties (cycles in which no data is transferred), thus reducing the effective bandwidth.

For an example of fully hidden bank-management latencies, assume that the bank-management latency to change a page of a bank is 18 clocks. There are four sets of requests to different pages in banks {0,1,2,0}, with 6 CDTs for each set. If the sets are ordered by bank as {0,1,2,0}, then by the time the second set accessing a different page of bank 0 is encountered, then bank 0 has already finished the page switch. Thus, the bank-management latency has been hidden, since the number of CDTs in between has also been 18. Accordingly, in one embodiment, as request stream 201 is received, page stream sorter 200 is configured to collate the requests so that DRAM controller 240 can issue accesses to the same page of a bank 230 in DRAM 220 until the bank management latency is hidden, provided sufficient input traffic exists to do so.

For an example of partially exposed bank-management-latencies, assume that there are four sets of requests to different pages of banks {0,1,2,0} with 6, 3, 6, 6 CDTs respectively. Since there are only 15 CDTs between the requests for different pages of bank 0, there are 3 clocks of latency that are exposed as penalties. Another such example illustrates the flexibility in bank sequencing. If each of the sets has 6 CDTs, then an ordering of {0,0,1,2} incurs a penalty of 12 clocks since only 6 CDTs occur between the requests for different pages of bank 0. However, the order of {0,1,2,0} incur zero clocks wasted because there are 18 CDTs between the requests for different pages of bank 0. One skilled in the art will appreciate the numbers used here are illustrative and that different memories will have different latencies.

Accordingly, besides reducing the number of page faults, the bins can be emptied in a manner to increase the total throughput of data transfers. In one embodiment, a minimum transfer size (if available) for a specific page are typically unloaded at any one time. The minimum number may result from amortizing the bank management latency (e.g. 18 clocks) over an expected number of banks with traffic (e.g. 3 banks), but should be at least as large as the activate-to-activate latency. For example, 6 CDTs may cost the same as a single data transfer. Thus, this minimum number can define an efficient size for a series of data transfers, and thus for the size of a bin. There also may be a limit as to how many CDTs or requests are emptied from a particular bin, which is explained in more detail later.

Dynamically Created Bins for Received Requests

Figure 3:
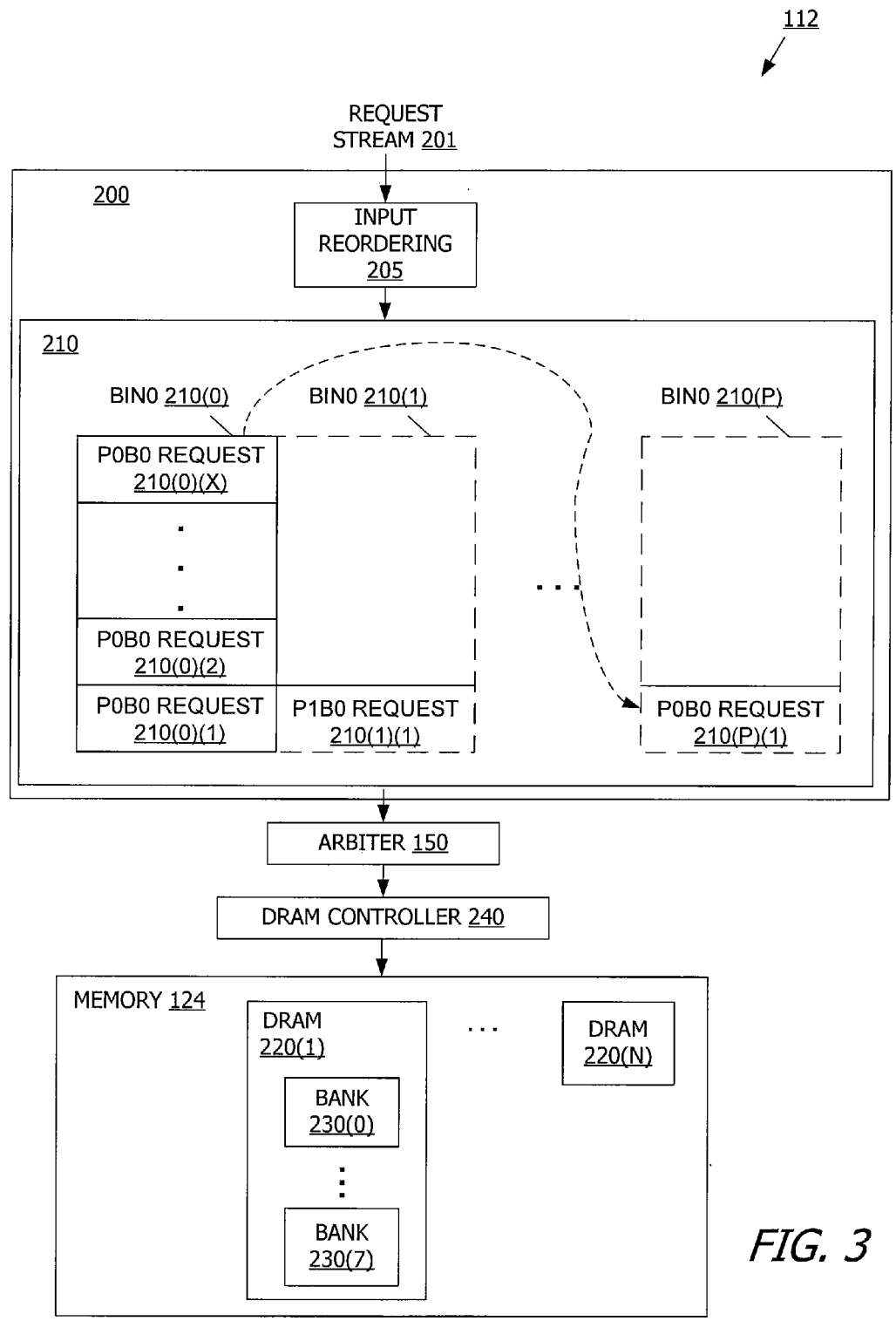
FIG. 3 illustrates further detail of dynamically created bins 210 of page stream sorter 200 of FIG. 2, in some embodiments in accordance with the present invention.

FIG. 3 illustrates further detail of dynamically created bins 210 of page stream sorter 200 of FIG. 2, in some embodiments in accordance with the present invention. In such embodiments, bins 210 comprise a multithreaded FIFO with a dynamically created bin per thread. The multithreaded FIFO provides a linked list structure for requests buffered in bins 210. In some embodiments, the multithreaded FIFO uses common storage for individual threads (e.g. in registers of PPU 122 of FIG. 1).

In some embodiments, each bin 210 provides one load port and one unload port. As described further below, different mechanisms may be used to determine which thread (bin) to unload. The use of bins 210 of page stream sorter 200 is described with respect to FIG. 4, so that FIGS. 3 and 4 are discussed together.

Figure 4:
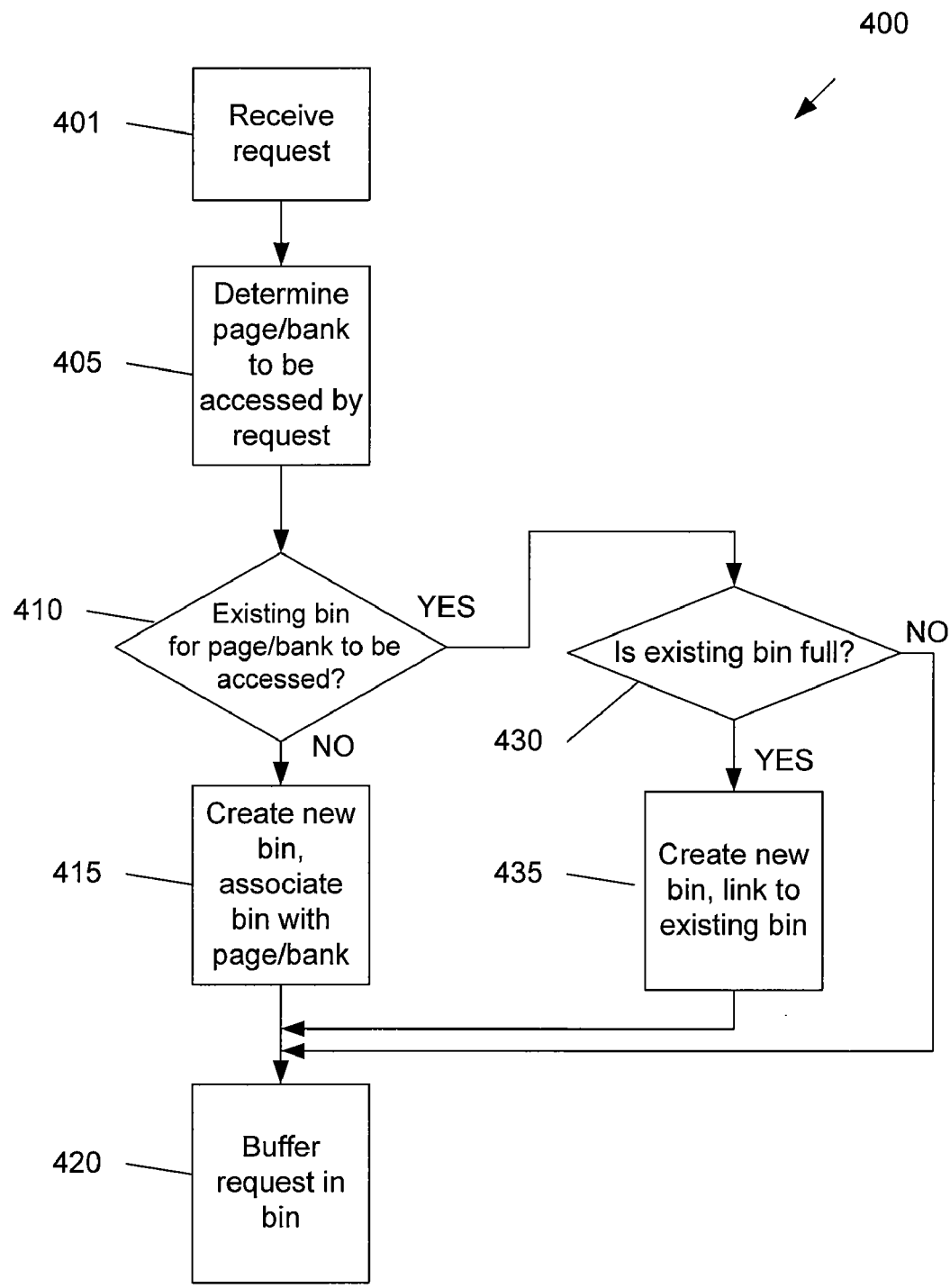
FIG. 4 illustrates a flowchart 400 for a method of operation of page stream sorter 200 of FIGS. 2 and 3, in one embodiment in accordance with the present invention.

FIG. 4 illustrates a flowchart 400 for a method of operation of page stream sorter 200 of FIGS. 2 and 3, in one embodiment in accordance with the present invention. Although described in a particular order, persons of ordinary skill in the art will recognize that the acts of flowchart 400 may be changed and the order of the acts may be altered without departing from the spirit of the present invention.

At act 401, a request is received into page stream sorter 200. At act 405, the page (or row/bank) to be accessed by the received request is determined by input reordering circuit 205.

At act 410, a check is made whether a bin 210 already exists for the page to be accessed by the request. If no bin 210 currently exists for the page to be accessed by the received request, then at act 415 a new bin 210 is dynamically created and associated with the page to be accessed. At act 420, the request is stored in the newly created bin 210. For example as shown in FIG. 3, a request 210(1)(1) to access row1bank0 may be stored in a newly created bin 210(1). Note that bins 210 in FIG. 3 are illustrated for the sake of clarity as filling in order from bottom (earlier-received requests) to top (later-received requests).

On the other hand, if at act 410 a bin 210 already exists for the row/bank to be accessed by the received request, then at act 430 a check is made to determine whether the existing bin 210 is already full. If the existing bin 210 is not full, then at act 420 the request is stored in the existing bin 210 associated with the page to be accessed by the request. For example as shown in FIG. 3, a second request 210(0)(2) to access row0bank0 may be stored in bin 210(0) associated with the page to be accessed.

Until a bin has filled to include a predetermined size of requests, the method described above repeats. For example, upon initially receiving a request to access row0bank0, a newly created bin 210(0) may include only request 210(0)(1). A second request 210(0)(2) to access row0bank0 may then be received and stored in bin 210(0). Additional requests to access row0bank0 may be stored in bin 210(0) until a predetermined size X (total clock data transfers) of requests have been received and stored.

Note that the second request 210(0)(2) may be (but need not be) received immediately after the first request 210(0)(1) stored in bin 210(0). Request 210(0)(2) may be received after a number of requests (such as request 210(1)(1) and others) have been received into page stream sorter 200.

If at act 430 the existing bin 210 is full (e.g., bin 210(0) has been filled with a predetermined size X of requests to access row0bank0 and has not been emptied), then at act 435 a new bin 210 is created and may be linked to the existing filled bin 210. For example as shown in FIG. 3, if bin 210(0) is filled with a predetermined size X of requests (e.g., eight) to access row0bank0, and the newly received request is another request to access row0bank0, then a new bin 210(P) may be created and linked to the existing filled bin 210(0). At act 420, the request is stored in the newly created bin. For example, request 210(P)(1)) to access row0bank0 is stored in bin 210(P) that is linked to bin 210(0).

Advantageously, the multithreaded FIFO embodiment for bins 210 provides a structure in which requests are not necessarily stored in the order received into page stream sorter 200, but rather are stored in an order providing for efficient access to memory 124. For example, bin 210(0) may include eight CDTs from requests to access row0bank0, where the requests have not necessarily been successively received into page stream sorter 200. Rather, the requests may have accumulated over time in bin 210(0). However, emptying all requests stored in bin 210(0) allows page stream sorter 200 to issue a number of successive requests to row0bank0 without undue page switching in memory 124.

Determining Bin Size and Unloading of Bins

Distributing latency amongst multiple clients (e.g. applications running in parallel on processing engines 140 of FIG. 1) provides one criteria for determining the size of bins 210. Typically, arbiter 150 should distribute memory 124 accessing latencies somewhat equitably between clients, although adjustments may be made for clients with different latency tolerances.

For example, if one of the bins 210 (e.g., bin 210(0)) is filled with 18 CDTs, but only eight CDTs to a page are needed to provide for good DRAM efficiency, it may be the case that granting all 18 CDTs from bin 210(0) by unloading the bin completely may provide suboptimal latency distribution for memory 124. If a second client has requests that are of high urgency buffered in bin 210(1), for example, then the second client will need to wait until the eighteen CDTs of bin 210(0) are serviced. Thus, granting more than the number of CDTs needed for DRAM efficiency can distribute latency unfairly among clients. Accordingly, a bin may ostensibly be capped at a predetermined size, although a "soft cap" may be used, as described below.

In one aspect, a predetermined size (efficient size or more) of a bin is chosen so as to manage the time that other bins, which contain requests to other pages, have to wait to be unloaded. Without a bound on this unload latency, unfairness could cause significant latencies above and beyond the clients' latency tolerances, or in the most extreme case, starvation. Some embodiments may bound latency by maintaining bin-creation-time ordering information and restricting the size of each bin. For each bank, the oldest bin for that bank may be selected, regardless of whether or not that bin is full.

By capping each of the bins 210 to a predetermined size (X), unloading all requests stored in a bin can enable efficient bandwidth sharing as well as enabling a contiguous stream of requests to memory 124 that is large enough to be efficient. In other embodiments, a cap is based on the number of requests.

In embodiments where bins 210 comprise a multithreaded FIFO using common storage among threads, once a bin 210 in the multithreaded FIFO is emptied of buffered requests, storage used by the bin may be freed up and allocated to another thread for a different row/bank or page.

In one embodiment, the cap on the size of a particular bin may be increased. For example, where the cap is 6 CDTs and a bin has 4 CDTs currently stored, then a request with 4 CDTs may be fully accommodated within that bin. Thus, the cap may be increased to 8 CDTs so that all of the data transfers for that request may be stored in the same bin. Thus, the predetermined size of a bin may be a "soft cap."

In alternative embodiments, each of the bins 210 may be capped to a predetermined number of CDTs (e.g., eight), but bins may be "chained" or linked together. Thus, 18 CDTs to access the same row/bank or page (e.g., row0bank0) may be stored in a first bin of eight CDTs, a second bin of eight CDTs, and a third bin of two CDTs.

Bin chaining also allows a "soft" limit on the size of an output stream for a given page from the page stream sorter 200, where a bin 210 is unloaded completely once filled and a chained bin is also unloaded when partially filled below a certain amount. For example, as shown in FIG. 3, bin 210(0) may be completely filled with eight CDTs to access row0bank0, and bin 210(P) is linked to bin 210(0), where bin 210(P) includes one request to access row0bank0. It may be relatively more efficient to unload completely filled bin 210(0) and then unload partially filled bin 210(P), which provides nine successive accesses to row0bank0. This is compared to unloading bin 210(0), unloading another bin that accesses another page and requires a page switch, and then unloading bin 210(P), which may have too few CDTs to hide latencies. This efficiency determination may be based on the probability that not enough additional requests or CDTs would be received before the subsequent unloading of bin 210(P), thus decreasing the effective bandwidth.

Whether the linked bin is unloaded in succession with the earlier filled bin may be determined based on the number of CDTs in the linked bin. If the linked bin includes a larger number of CDTs than a specified amount (e.g. half of the cap size or the efficient size), then the linked bin may not be unloaded in succession. For example if bin 210(0) includes eight CDTs and bin 210(P) includes five CDTs, then bin 210(0) may be unloaded and bin 210(P) left unloaded, since in the future after other bins are unloaded (to maintain bandwidth sharing), bin 210(P) may by then be completely filled.

In such embodiments, an age of each bin 210 may be stored, for example where the age of a bin 210 represents an age of a request at the head of the bin 210 (the age of the oldest request in the bin). In some embodiments, additional circuitry (not shown) is included to store age and/or other information of each request in each bin 210.

Providing the age of bins 210 can enable efficient selection of bins for output. For example, 18 CDTs to access row0bank0 may be stored in a first bin 210(0) of eight CDTs, a second bin 210(1) of eight CDTs, and a third bin 210(2) of two CDTs. The first bin 210(0) may be relatively old, while the second bin 210(1) and third bin 210(2) may be relatively young. By examining the age of the bins 210, it may be relatively more efficient for arbiter 150 to unload the first bin 210(0) completely, but leave the second and third bins to age further, during which time page stream sorter 200 might unload a fourth bin 210(5) that accesses row1bank0. By evaluating the age of chained bins, portions of the chained bins can be partially unloaded, so that arbiter 150 can service just enough requests to enable efficient access to memory 124 while preserving bandwidth sharing policies and latency constraints.

In one embodiment, the decision to unload linked bins may be dynamically chosen, for example, based on the number of banks with outstanding requests within memory 124. For example, there may be a bank imbalance where small numbers of banks have requests but the other banks do not. When there is a bank imbalance, additional chaining may be dynamically allowed. This additional chaining may be done even when the number of CDTs in the linked bin is relatively large and would not normally be chained absent the imbalance. The additional chaining amortizes the expected penalty over a larger transfer size. The predetermined size for purposes of capping may also be changed to achieve a similar effect as the additional chaining.

In other alternative embodiments, each bin 210 is relatively deep (e.g., 64 CDTs deep) and may be partially unloaded. In some such embodiments, an age of each request in the bin may be stored, to allow page stream sorter 200 to determine how much of the bin to unload. In other such embodiments, for example with a cap based on the number of requests, age and/or other information may be stored for every nth request in each bin (e.g. where each bin comprises a maximum of 32 requests and n=8, an age of the 1st, 9th, 17th, and 25th requests in the bin may be stored). In such embodiments, the bin may be unloaded at least to the nth request (unload up to 8 requests at a time from the bin).

In some embodiments, the amount of storage provided to each thread may be allocated based on row/bank latency considerations. For example, where the bank-management latency for page switching in DRAM 220(1) is considerably less than bank-management latency for page switching in DRAM 220(N), the number of requests that may be buffered in bins 210 associated with DRAM 220(1) may be different than the number of requests that may be buffered in bins 210 associated with DRAM 220(N).

Hierarchical Page Stream Sorter with Front Bins and Back Bins

In some applications, the received request stream 201 is so disordered (or the number of pages in memory 124 is so large) that a fairly large number of bins (e.g., 96 or more) is provided for in the page stream sorter. However, the large number of bins provides a correspondingly large number of outputs to arbiter 150. For example, with 96 outputs to arbitrate between, arbitration logic in arbiter 150 becomes quite complex. Therefore, in some embodiments, the page stream sorter is subdivided into multiple page stream sub-sorters and multiple first stage sub-arbiters that limits the load on arbiter 150.

Figure 5:
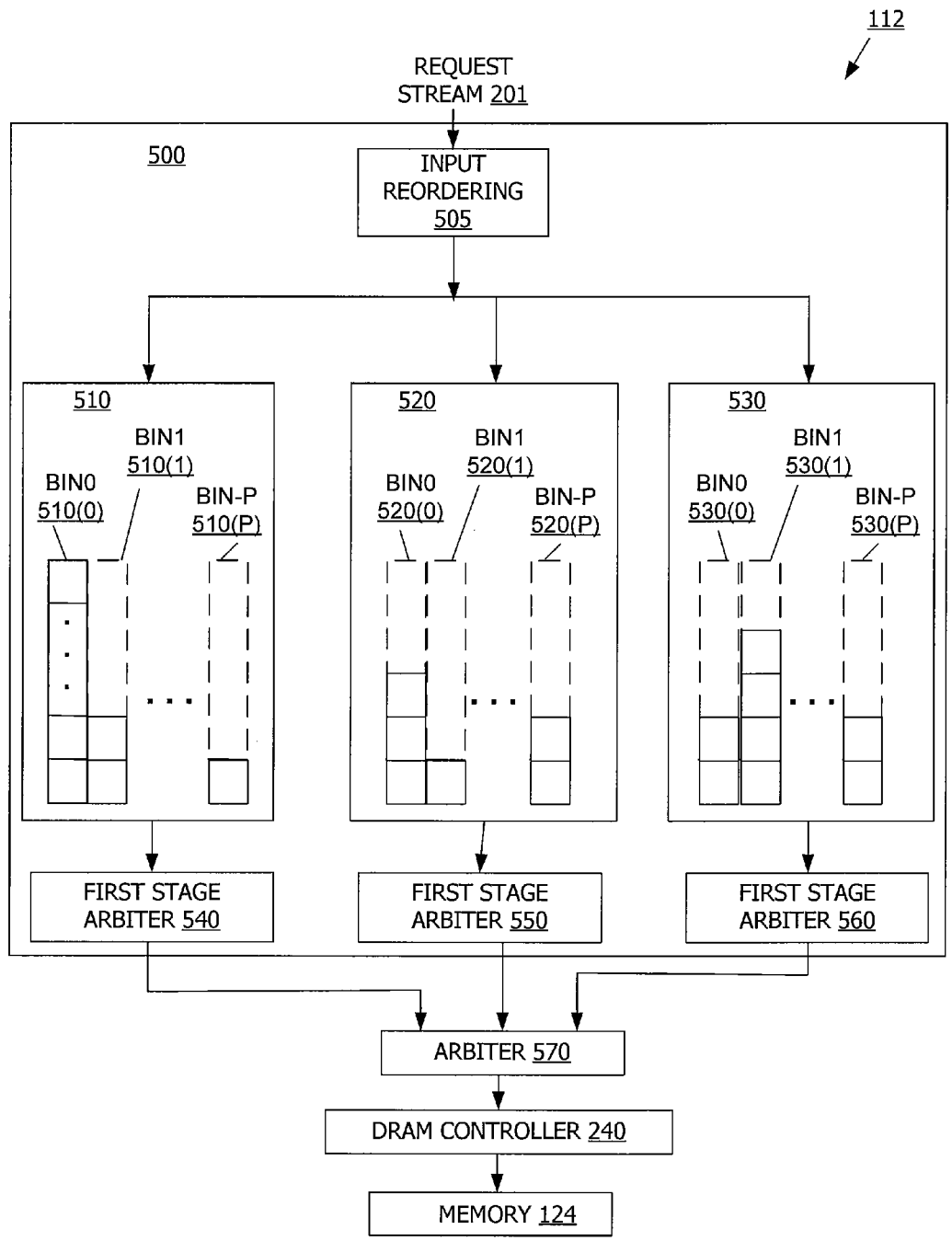
FIG. 5 illustrates a hierarchical architecture having multiple page stream sub-sorters 510, 520, and 530, and multiple first stage sub-arbiters 540, 550, and 560, in one embodiment in accordance with the present invention.

FIG. 5 illustrates a hierarchical architecture for a page stream sorter 500 having multiple page stream sub-sorters 510, 520, and 530, and multiple first stage sub-arbiters 540, 550, and 560, in one embodiment in accordance with the present invention. Page stream sub-sorters 510, 520, and 530 are similar to page stream sorter 200 described with respect to FIGS. 2-4. Page stream sub-sorters 510, 520, and 530 may be the same (e.g., incorporating the same number and size of bins) or may be different (e.g., the number and size of bins 510 may be different than the number and size of bins 530).

In overview, page stream sub-sorters 510, 520, and 530 provide 96 bins of storage for requests, subdivided into 32 "back bins" in each sub-sorter. In one embodiment, the number of back bins is fixed. In another embodiment, the number of back bins may be dynamically determined. Each of the first stage sub-arbiters 540, 550, and 560 picks from the 32 back bins to provide a predetermined number of desirable bins (e.g., four) to expose to a downstream arbiter 570. In this embodiment, page stream sub-sorters 510-530, and first stage sub-arbiters 540-560 reduce the load presented to downstream arbiter 570 by a factor of 8 as compared to a page stream sorter having a "flat" non-hierarchical organization. In another embodiment, the number of bins exposed to downstream arbiter 570 is not predetermined, but may be dynamically determined.

In some embodiments, a "front bin" data structure exists for pipelining the requests from a number of back bins to downstream arbiter 570. This data structure may include a set of registers providing the valid and row-bank information from the back bin, as well as a short output FIFO for pipelining requests from the back bins. In one aspect, the front bins are located between the first stage sub-arbiters 540-560 and downstream arbiter 570. In another aspect, downstream arbiter 570 is composed of multiple downstream arbiters.

A number of different criteria or factors may be used in sub-arbiters 540-560 to determine which of the back bins are presented to downstream arbiter 570. The criteria or factors may be used singly or in various combinations.

In some embodiments, sub-arbiters 540-560 select bins based upon time ordering, whereby older bins are preferentially presented to downstream arbiter 570. In other embodiments, sub-arbiters 540-560 can share information and select bins such that each bin presented to arbiter 150 accesses different banks in memory 124, so that downstream arbiter 570 can interleave between banks. In still other embodiments, sub-arbiters 540-560 select bins based upon the number of requests or CDTs stored in the back bins.

In still further embodiments, sub-arbiters 540-560 select bins based upon, for each bank, the "best" client that accesses that bank. The determination of which client is "best" may be based on how old the bin is (how long ago the bin was started), how full the bin is (a full or nearly full bin is desired for efficient DRAM access, and an almost empty bin may be allowed to accumulate more requests if the bin is not too old), and/or whether more than one page of the same bank is exposed to downstream arbiter 570.

Information stored for a bin may be fed forward to sub-arbiters 540-560 and/or downstream arbiter 570 so that the arbiters can make good decisions. For example, for a given bin, information may be stored on relative order of time of arrival of requests in the bin, but may also include absolute time of arrival of the request. Downstream arbiter 570 may determine which page stream sub-sorters 510, 520, and 530 to service, for example, by analysis of absolute age of bins, number of requests or CDTs in the bins, row/bank match of requests presented to downstream arbiter 570, whether requests are reads or writes so that read requests can be grouped with other read requests and write requests can be grouped with other write requests, and so on.

Alternative Embodiments

In some embodiments, the page stream sorter is organized into a first page stream sorter for read requests and a second page stream sorter for write requests, so that arbiter 150 can prevent unnecessary turns on the interface to memory 124.

In other embodiments, the page stream sorter is not subdivided into a read page stream sorter and a write page stream sorter, but instead bins are marked as buffering either read requests or write requests. Arbiter 150 is configured to exclude write requests from being serviced while arbitrating between read requests, and vice versa, and implements a global policy on when to change from writes to reads or vice versa. The global policy may be based on information such as how many pending read requests or write requests there are in bins of the page stream sorter.

Page stream sorter 200 described above with respect to FIGS. 2 to 4 is optimized based on bins matched to row/bank or page in memory 124, where a collection of requests is stored in a common pool of bins and each of the bins is allowed to have a variable number of locations in the pool. However, in some embodiments, for every bin in page stream sorter 200 there may be a fixed number of locations available in the common pool, and a sharing policy. A potential advantage of such an arrangement is relatively simpler circuitry for page stream sorter 200. For example, page stream sorter 200 may include a single buffer, and segments of the buffer can be allocated to bins (e.g. a first bin from address 0x0000 to 0x000F, a second bin from 0x0010 to 0x001 F, and so on). However, limitations are presented in such an arrangement, such as the number of requests that can be stored in a bin.

In contrast, with the multithreaded FIFO described with respect to FIG. 2, a bin is not created until a request is received. The multithreaded FIFO begins with a predetermined amount of space, a common pool of shared memory, and as bins fill up with requests the bins consume the memory space that is allocated on the fly.

In some embodiments, the page stream sorter (e.g., page stream sorter 500 of FIG. 5) can receive feedback from the DRAM controller to allow better decisions and provide better DRAM efficiency. For example, DRAM controller 240 can send information to each of page stream sub-sorters 510-530 (or sub-arbiters 540-560) on current bank status and/or upcoming bank status. For example, with information that a given bank (e.g., bank 0) is ready to accept requests, or will be ready to accept requests in the near future (e.g., the five clock cycles from the current time), page stream sub-sorters 510-530 and/or sub-arbiters 540-560 can present a set of options to downstream arbiter 570 based on the feedback so that bank 0 will "win" the decision by downstream arbiter 570. Such embodiments may include logic that restricts back bins from entering the candidate list until they are eligible according to the current bank state, as indicated by DRAM controller 240. With a large enough number of banks in memory 124, providing feedback on current and/or upcoming bank state can improve efficiency in downstream arbiter 570 and memory 124.

While the invention has been described with respect to specific embodiments, one skilled in the art will recognize that numerous modifications are possible. Thus, although the invention has been described with respect to specific embodiments, it will be appreciated that the invention is intended to cover all modifications and equivalents within the scope of the following claims.

What is claimed is:

1. A method comprising:
receiving a stream of requests to access a memory;
dynamically creating one or more bins in which to buffer the stream of requests; and
outputting requests from one or more of the bins to an arbiter coupled to the memory,
wherein dynamically creating one or more bins comprises ordering the one or more bins into a number N of back bins, the number N equal to two or more, further comprising for each of the back bins:
determining a subset of bins of the back bins to output; and
outputting the subset of bins of the back bin to a number M of front bins, the number M less than the number N.

2. The method of claim 1, wherein the arbiter includes one or more first stage arbiters coupled with the back bins and one or more downstream arbiters coupled with the front bins.

3. The method of claim 1 wherein dynamically creating one or more bins comprises, for each request:
determining a page in the memory to be accessed with the request; and
buffering one or more requests in a first bin based upon the page to be accessed.

4. The method of claim 3, further comprising:
buffering one or more requests into the first bin based on whether a request is a read or write access.

5. The method of claim 3, further comprising:
buffering one or more requests in each of the bins based upon the page to be accessed for each request, wherein the order of outputting requests from the bins is based upon the page or bank of the requests buffered in the bins.

6. The method of claim 5, wherein the order of outputting requests from the bins is further based upon at least one of an age of a bin or request within the bin, a number of requests buffered within a bin, a latency tolerance for a request in a bin, whether an access read or write access, and an identity of a requestor of the requests within a bin.

7. The method of claim 3 wherein outputting from one or more of the bins comprises emptying the first bin of buffered requests.

8. The method of claim 3 further comprising:
filling the first bin with a predetermined size of requests; and
dynamically creating a second bin linked to the first bin, the second bin buffering one or more requests based upon the page to be accessed, wherein the second bin is any bin successive to the first bin.

9. The method of claim 8 wherein the second bin is partially filled, and wherein outputting comprises emptying the filled first bin of buffered requests and emptying the second bin after emptying the first bin.

10. A method, comprising:
receiving a stream of requests to access a memory;

dynamically creating one or more bins in which to buffer the stream of requests;
outputting requests from one or more of the bins to an arbiter couple to the memory;
receiving status information from the memory; and
outputting requests based at least in part on the status information.

11. A system, comprising:
a memory;
an arbiter couples to the memory; and
a page stream sorter coupled to a arbiter, the page stream sorter configured to:
  receive a stream of requests to access the memory;
  dynamically create one or more bins in which to buffer the stream of requests; and
  output requests from one or more of the bins to the arbiter,
wherein the page stream sorter comprises:
a number N of back bins, the number N equal to two or more; and
a sub-arbiter couple to each of the back bins, each of the sub-arbiters configured to determine a subset of bins of the back bin to output to the arbiter.

12. The system of claim 11 wherein the page stream sorter comprises circuitry configured to:
determine a page in the memory to be accessed with the request; and
buffer one or more requests in a first bin based upon the page to be accessed.

13. The system of claim 12 the page stream sorter comprises circuitry configured to:
fill the first bin with a predetermined size of requests; and
dynamically create a second bin linked to the first bin, the second bin configured to buffer one or more requests based upon the page to be accessed, wherein the second bin is any bin successive to the first bin.

14. The system of claim 13 wherein the page stream sorter comprises circuitry configured to empty the filled first bin of buffered requests and empty the second bin after emptying the first bin.

15. The system of claim 11 wherein the page stream sorter comprises circuitry configured to:
receive status information from the memory; and
output requests based at least in part on the status information.

16. A system, comprising:
a memory;
an arbiter coupled to the memory; and
a page stream sorter coupled to the arbiter, the page stream sorter configured to:
  receive a stream of requests to access the memory;
  dynamically create one or more bins in which to buffer the stream of requests; and
  output requests from one or more of the bins to the arbiter; and
one or more processors coupled to the page stream sorter, wherein the order of outputting requests from the bins is based upon which processor sent a request in a bin.

17. A method, comprising:
receiving a stream of requests to access a memory;
buffering one or more requests into N back bins;
outputting a subset of bins of the N back bins to a number M of front bins, the number M less than the number N; and
outputting requests from one or more of the front bins to an arbiter coupled to the memory.

18. The method of claim 17, wherein the number N of back bins is fixed.

19. The method of claim 10 wherein dynamically creating one or more bins comprises, for each request:
determining a page in the memory to be accessed with the request; and
buffering one or more requests in a first bin based upon the page to be accessed.

20. The system of claim 16 wherein the page stream sorter comprises circuitry configured to:
determine a page in the memory to be accessed with the request; and
buffer one or more requests in a first bin based upon the page to be accessed.

* * * * *